United States Patent
Okada

[11] Patent Number: 6,073,195
[45] Date of Patent: Jun. 6, 2000

[54] BUS CONTROLLERS ENSURING REDUCED POWER CONSUMPTION AND STABLE OPERATION

[75] Inventor: Yukihiro Okada, Kawasaki, Japan

[73] Assignee: Fujitsu Limited, Kawasaki, Japan

[21] Appl. No.: 09/145,965

[22] Filed: Sep. 3, 1998

[30] Foreign Application Priority Data

Jan. 26, 1998 [JP] Japan .................................. 10-012686

[51] Int. Cl.⁷ .................................................. G06F 13/00
[52] U.S. Cl. ........................................... 710/102; 773/300
[58] Field of Search ................... 713/300–340; 710/102, 103

[56] References Cited

U.S. PATENT DOCUMENTS

| | | |
|---|---|---|
| 4,980,836 | 12/1990 | Carter et al. . |
| 5,461,266 | 10/1995 | Koreeda et al. . |
| 5,796,992 | 8/1998 | Reif et al. ................. 713/500 |
| 5,884,053 | 3/1999 | Clouser et al. .......... 710/126 |
| 5,896,514 | 4/1999 | Spaniol ................... 710/107 |

FOREIGN PATENT DOCUMENTS

| | | |
|---|---|---|
| 93/07558 | 4/1993 | Canada . |
| 62-85374 | 4/1987 | Japan . |
| 2-176921 | 7/1990 | Japan . |
| 5-11898 | 1/1993 | Japan . |

OTHER PUBLICATIONS

Patent Abstracts of Japan, vol. 14, No. 483 (E–0993), Oct. 22, 1990 & JP 02 198226 A (Matsushita Electric Ind Co Ltd), Aug. 6, 1990.

Patent Abstracts of Japan, vol. 18, No. 484 (P–1798), Sep. 8, 1994 & JP 06 161619 A (Just Syst Corp), Jun. 10, 1994.

*Primary Examiner*—Glenn A. Auve
*Assistant Examiner*—David A. Wiley
*Attorney, Agent, or Firm*—Staas & Halsey LLP

[57] ABSTRACT

A bus controller includes a plurality of bus connectors provided in a bus so as to respectively and selectively connect a plurality of bus agents to the bus and disconnect the plurality of bus agents from the bus; and a bus connection controller for monitoring the bus and for controlling the plurality of bus connectors so as to disconnect any bus agent not accessed for a predetermined period of time.

5 Claims, 8 Drawing Sheets

BUS CONTROLLERS ENSURING REDUCED POWER CONSUMPTION AND STABLE OPERATION

BACKGROUND OF THE INVENTION

1. Field of the Invention

The present invention generally relates to bus controllers and, more particularly, to a bus controller for controlling connection of bus agents to a bus.

Recently, as the operating speed of computer systems is improved, a demand for a high-speed bus inside a system is growing. In order to facilitate improvement in the speed of a bus, the standards impose a severe requirement for electrical performance on a bus. In order to insure a stable operation in the bus constructed under the severe requirement, the electrical characteristic of the bus should be stabilized.

2. Description of the Related Art

Conventionally, a bus is provided with a plurality of connectors so that a bus agent in the form of an add-in card is connected to each of the connectors. The number of bus agents connected to the bus is variable. No bus controller for managing the bus agents connected to the bus is provided. Each of the bus agents connected to the bus continually decodes an address delivered on the bus so as to determine whether an access to the bus agent occurs.

The load imposed on a driver (also provided in each of the bus agents) for driving the bus varies depending on the number of bus agents connected to the bus. For this reason, the operation of the bus with a severe requirement for electrical performance may be unstable.

Since the bus agents are operated such that even those bus agents connected to the bus but not accessed for a long period of time decode an address delivered on the bus, there is a problem in that an unnecessarily large power consumption may result.

SUMMARY OF THE INVENTION

Accordingly, a general object of the present invention is to provide a bus controller in which the aforementioned problems are eliminated.

Another and more specific object is to provide a bus controller in which the operation of unnecessary bus agents is stopped so that the overall power consumption is reduced.

The aforementioned objects can be achieved by a bus controller for controlling connection of a plurality of bus agents to a bus, comprising a plurality of bus connectors provided in the bus so as to respectively connect the plurality of bus agents to the bus and to respectively disconnect the plurality of bus agents from the bus; and a bus connection controller for monitoring the bus and for controlling the plurality of bus connectors so as to disconnect any bus agent which is not accessed for a predetermined period of time.

According to the bus controller of the present invention, the bus agent not accessed for a predetermined period of time and disconnected from the bus does not decode an address supplied via the bus. In this way, the power consumption is reduced.

Each of the bus connectors may have a switch for selectively connecting one of the bus agent and a dummy load to the bus such that the dummy load is connected to the bus when the bus agent is disconnected from the bus.

According to this aspect of the invention, the overall electrical load on the bus is maintained at a constant level so that the stable operation of the bus is achieved.

The bus controller may further comprise a clock controller for supplying a clock signal to each of the bus agents. The bus connection controller may control the clock controller either to reduce a frequency of the clock signal supplied to a bus agent disconnected from the bus or to stop supply of the clock signal to a bus agent disconnected from the bus.

According to this aspect of the invention, the power consumption in the disconnected bus agent is reduced.

The bus controller may further comprise a power supply voltage controller for supplying a power supply voltage to each of the bus agents, and the bus connection controller may control the power supply voltage controller either to reduce a level of voltage supplied to a bus agent disconnected from the bus or to stop supply of the power supply voltage to a bus agent disconnected from the bus.

According to this aspect of the invention, the power consumption in the disconnected bus agent is reduced.

The bus connection controller may reduce an external load driving performance of the bus agent disconnected from the bus.

According to this aspect of the invention, the overall electrical load on the bus is maintained at a constant level by a simulated means of reducing the external load driving performance of the bus agent.

The bus may be a PCI bus, the bus controller may be adapted for a bus bridge for connecting the PCI bus and a host bus, and the bus connection controller may comprise: a request monitor unit for monitoring a request from each of the plurality of bus agents to use the PCI bus and disconnecting a bus agent not issuing the request for a predetermined period of time from the bus; and a bus monitor unit for monitoring an address supplied from the PCI bus and the host bus to each of the plurality of bus agents and for disconnecting a bus agent not accessed for a predetermined period of time from the PCI bus.

According to this aspect of the invention, the bus agent not accessed for a predetermined period of time is disconnected from the PCI bus and the bus agent not issuing a request to use the PCI bus for a predetermined period of time is disconnected from the PCI bus.

The bus monitor unit may monitor a signal for controlling each of the plurality of bus connectors and a signal for granting a right to use the PCI bus, and cancel a grant of the right to use the PCI bus when a grant is issued to the disconnected bus agent.

According to this aspect of the invention, a grant of a right to use the bus is prevented from being supplied to the disconnected bus agent, thus preventing the PCI bus from becoming unavailable.

The bus monitor unit may monitor a signal for controlling each of the plurality of bus connectors, and, when an access to the disconnected agent is detected, request a retry of the access and cancel the disconnection.

According to this aspect of the invention, an access to the disconnected bus agent can occur for a second time after a requested bus agent is connected to the PCI bus again.

BRIEF DESCRIPTION OF THE DRAWINGS

Other objects and further features of the present invention will be apparent from the following detailed description when read in conjunction with the accompanying drawings, in which.

DETAILED DESCRIPTION OF THE PREFERRED EMBODIMENTS

Figure 1:
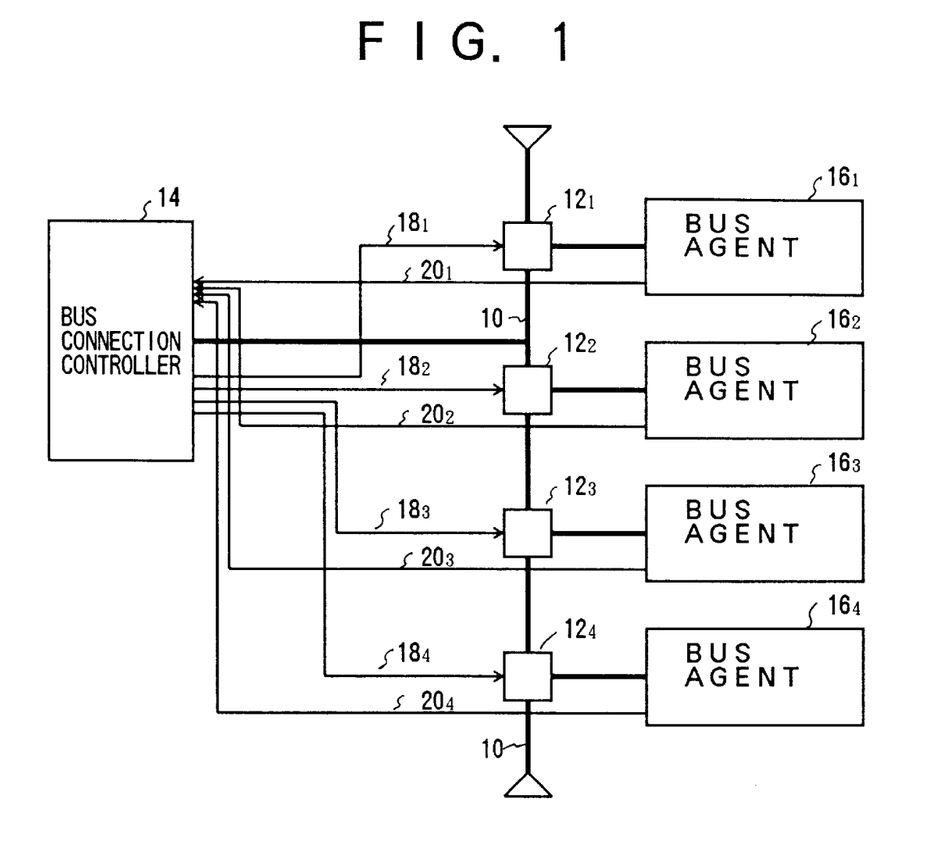
FIG. 1 is a block diagram showing a bus controller according to a first embodiment of the present invention.

FIG. 1 is a block diagram showing a bust controller according to a first embodiment of the present invention. A plurality of bus connectors $12_1$–$12_4$ are provided in a bus 10. The bus 10 is connected to a bus connection controller 14. Bus agents $16_1$–$16_4$ are connected to the bus connectors $12_1$–$12_4$, respectively. Of course, the number of bus agents connected to the bus connectors $12_1$–$12_4$ may vary. Only the bus agents that are necessary may be connected to the respective bus connectors. The bus agents $16_1$–$16_4$ input and output information via the bus 10. For example, the bus agents $16_1$–$16_4$ may be a hard disk drive, a flexible disk drive, a modem and the like.

The bus connectors $12_1$–$12_4$ are connected to the bus connection controller 14 via control lines $18_1$–$18_4$, respectively. The bus connection controller 14 supplies a bus agent connection signal or a bus agent disconnection signal to the bus connectors $12_1$–$12_4$. The bus agents $16_1$–$16_4$ connected to the bus connectors $12_1$–$12_4$, respectively, are also connected to the bus connection controller 14 via control lines $20_1$–$20_4$, respectively. Each of the bus agents $16_1$–$16_4$ supplies a request signal requesting the use of the bus 10 to the bus connection controller 14.

When the request signal is supplied by any of the bus agents $16_1$–$16_4$, the bus connection controller 14 supplies a bus agent connection signal to the bus connector to which the requesting bus agent is connected so as to control the bus connector to connect the requesting bus agent to the bus 10. The bus connection controller 14 also monitors the bus 10. When a bus agent connected to the bus 10 is not involved in an access to the bus 10 for a predetermined period of time, the bus connection controller 14 supplies a bus agent disconnection signal to the associated bus connector so as to control the bus connector to disconnect the associated bus agent from the bus 10.

Thus, when the request signal is supplied by any of the bus agents $16_1$–$16_4$, the bus agent connection signal is supplied to the bus connector to which the requesting bus agent is connected so that the requesting bus agent is connected to the bus 10. When a bus agent connected to the bus 10 is not involved in an access for a predetermined period of time, the bus agent disconnection signal is supplied to the associated bus connector so that the bus agent is disconnected from the bus 10. With this arrangement, the bus connection controller 14 can control connection of the bus agents $16_1$–$16_4$ to the bus 10. Since the bus agent disconnected from the bus 10 is not supplied with addresses from the bus 10, it is not necessary for the bus agent to decode an address. Accordingly, the power consumption is reduced.

Figure 2:
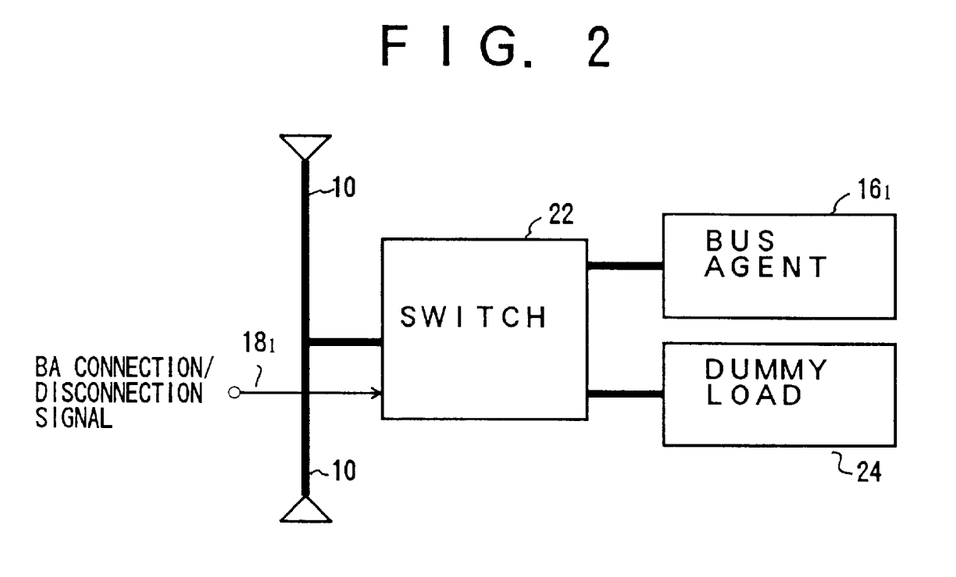
FIG. 2 is a block diagram of the bus connectors according to the first embodiment.

FIG. 2 is a block diagram of the bus connectors $12_1$–$12_4$ according to the first embodiment. The bus connector $12_1$ will be described as an example. Referring to FIG. 2, the bus connector is composed of a switch 22 and a dummy load 24. The switch 22 selects one of the bus agent $16_1$ and a dummy load 24 so as to connect the selected element to the bus 10. Selection is made depending on whether the bus agent connection signal or the bus agent disconnection signal is supplied by the bus connection controller 14 to the switch 22 via the control line $18_1$. When the bus agent connection signal is supplied, the bus agent $16_1$ is selected. When the bus agent disconnection signal is supplied, the dummy load 24 is selected. The dummy load 24 has substantially the same impedance as the bus agent $16_1$. It is assumed that each of the bus agents $16_2$–$16_4$ has substantially the same impedance as the bus agent $16_1$.

Since one of the bus agent $16_1$ and the dummy load 24 having substantially the identical impedance is connected to the bus 10, the load imposed on the driver (also provided in each of the bus agents) for driving the bus is maintained at a constant level even when the number of bus agents connected to the bus varies. Thus, the operation is stabilized even in the bus with a severe requirement for electrical performance.

Figure 3:
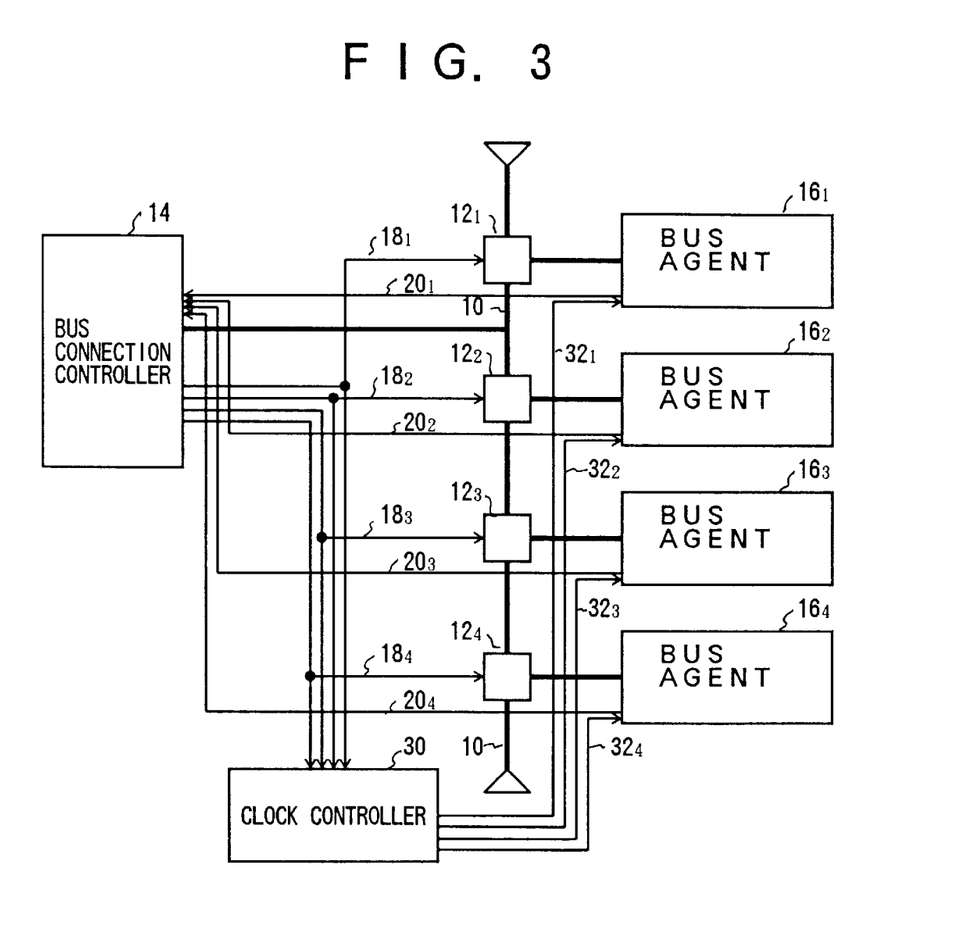
FIG. 3 is a block diagram of the bus controller according to a second embodiment of the present invention.

FIG. 3 is a block diagram showing the bus controller according to a second embodiment of the present invention. In FIG. 3, those elements that are identical to the corresponding elements of FIG. 1 are designated by the same reference numerals. The plurality of bus connectors $12_1$–$12_4$ are provided in the bus 10. The bus 10 is connected to the bus connection controller 14. The bus agents $16_1$–$16_4$ are connected to the bus connectors $12_1$–$12_4$, respectively. Of course, the number of bus agents connected to the bus connectors $12_1$–$12_4$ may vary. Only the bus agents that are necessary may be connected to the respective bus connectors. The bus agents $16_1$–$16_4$ input and output information via the bus 10. For example, the bus agents $16_1$–$16_4$ may be a hard disk drive, a flexible disk drive, a modem and the like.

The bus connectors $12_1$–$12_4$ are connected to the bus connection controller 14 via the control lines $18_1$–$18_4$, respectively. The bus connection controller 14 supplies a bus agent connection signal or a bus agent disconnection signal to the bus connectors $12_1$–$12_4$. The bus agents $16_1$–$16_4$ connected to the bus connectors $12_1$–$12_4$, respectively, are also connected to the bus connection controller 14 via the control lines $20_1$–$20_4$, respectively. Each of the bus agents $16_1$–$16_4$ supplies a request signal requesting the use of the bus 10 to the bus connection controller 14.

A clock controller 30 is supplied with the bus agent connection signal or the bus agent disconnection signal from the bus connection controller 14 via the control lines $18_1$–$18_4$. A clock signal generated by the clock controller 30 is supplied to the bus agents $16_1$–$16_4$ via clock lines $32_1$–$32_4$, respectively.

When the request signal is supplied by any of the bus agents $16_1$–$16_4$, the bus connection controller 14 supplies a bus agent connection signal to the bus connector to which the requesting bus agent is connected so as to control the bus connector to connect the requesting bus agent to the bus 10. The clock controller 30 supplied with the bus agent connection signal supplies the clock signal to the bus agent connected to the bus 10.

The bus connection controller 14 also monitors the bus 10. When a bus agent connected to the bus 10 is not involved in an access to the bus 10 for a predetermined period of time, the bus connection controller 14 supplies a bus agent disconnection signal to the associated bus connector so as to control the bus connector to disconnect the associated bus agent from the bus 10. The clock controller 30 supplied with a bus agent disconnection signal reduces a frequency of the clock signal supplied to the bus agent disconnected from the bus 10 or stops supplying the clock signal thereto.

Thus, when the request signal is supplied by any of the bus agents $16_1$–$16_4$, the bus agent connection signal is supplied to the bus connector to which the requesting bus agent is connected so that the requesting bus agent is connected to the bus 10 and the clock signal is supplied to the requesting bus agent. When a bus agent connected to the bus 10 is not involved in an access for a predetermined period of time, the bus agent disconnection signal is supplied to the associated bus connector so that the bus agent is disconnected from the bus 10 and the frequency of the clock signal supplied to the disconnected bus agent is reduced or the clock signal ceases to be supplied thereto. With this arrangement, the operation of the bus agent disconnected from the bus is stopped or slowed down. Accordingly, the power consumption is reduced.

Figure 4:
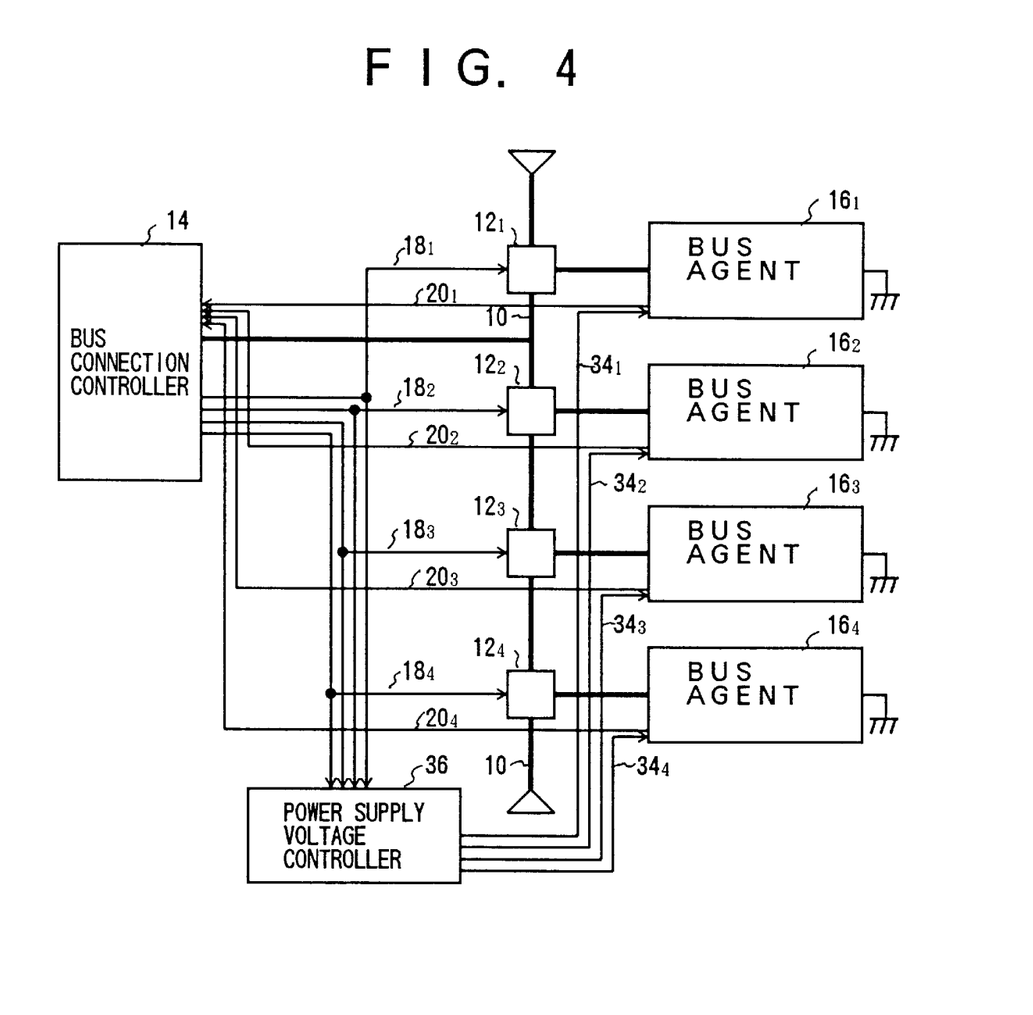
FIG. 4 is a block diagram of the bus controller according to a third embodiment of the present invention.

FIG. 4 is a block diagram showing the bus controller according to a third embodiment of the present invention. In FIG. 4, those elements that are identical to the corresponding elements of FIG. 1 are designated by the same reference numerals. The plurality of bus connectors $12_1$–$12_4$ are provided in the bus 10. The bus 10 is connected to the bus connection controller 14. The bus agents $16_1$–$16_4$ are connected to the bus connectors $12_1$–$12_4$, respectively. Of course, the number of bus agents connected to the bus connectors $12_1$–$12_4$ may vary. Only the bus agents that are necessary may be connected to the respective bus connectors. The bus agents $16_1$–$16_4$ input and output information via the bus 10. For example, the bus agents $16_1$–$16_4$ may be a hard disk drive, a flexible disk drive, a modem and the like.

The bus connectors $12_1$–$12_4$ are connected to the bus connection controller 14 via the control lines $18_1$–$18_4$, respectively. The bus connection controller 14 supplies a bus agent connection signal or a bus agent disconnection signal to the bus connectors $12_1$–$12_4$. The bus agents $16_1$–$16_4$ connected to the bus connectors $12_1$–$12_4$, respectively, are also connected to the bus connection controller 14 via the control lines $20_1$–$20_4$, respectively. Each of the bus agents $16_1$–$16_4$ supplies a request signal requesting the use of the bus 10 to the bus connection controller 14.

A power supply voltage controller 36 is supplied with the bus agent connection signal or the bus agent disconnection signal from the bus connection controller 14 via the control lines $18_1$–$18_4$. A power supply voltage $V_{cc}$ generated by the power supply voltage controller 36 is supplied to the bus agents $16_1$–$16_4$ via power lines $34_1$–$34_4$, respectively.

When the request signal is supplied by any of the bus agents $16_1$–$16_4$, the bus connection controller 14 supplies a bus agent connection signal to the bus connector to which the requesting bus agent is connected so as to control the bus connector to connect the requesting bus agent to the bus 10. The power supply voltage controller 36 supplied with the bus agent connection signal supplies the power supply voltage $V_{cc}$ to a bus agent connected to the bus 10.

The bus connection controller 14 also monitors the bus 10. When a bus agent connected to the bus 10 is not involved in an access to the bus 10 for a predetermined period of time, the bus connection controller 14 supplies a bus agent disconnection signal to the associated bus connector and the power supply voltage controller 36 so as to control the bus connector to disconnect the associated bus agent from the bus 10. The power supply voltage controller 36 supplied with the bus agent disconnection signal reduces a level of the power supply voltage supplied to the bus agent disconnected from the bus 10 or stops supplying the power supply voltage thereto.

Thus, when the request signal is supplied by any of the bus agents $16_1$–$16_4$, the bus agent connection signal is supplied to the bus connector to which the requesting bus agent is connected so that the requesting bus agent is connected to the bus 10 and the power supply voltage $V_{cc}$ is supplied to the requesting bus agent. When the bus agent connected to the bus 10 is not involved in an access for a predetermined period of time, the bus agent disconnection signal is supplied to the associated bus connector so that the bus agent is disconnected from the bus 10 and the level of the power supply voltage supplied to the disconnected bus agent is reduced or the power supply voltage ceases to be supplied thereto. With this arrangement, the operation of the bus agent disconnected from the bus is stopped or slowed down. Accordingly, the power consumption is reduced.

Figure 5:
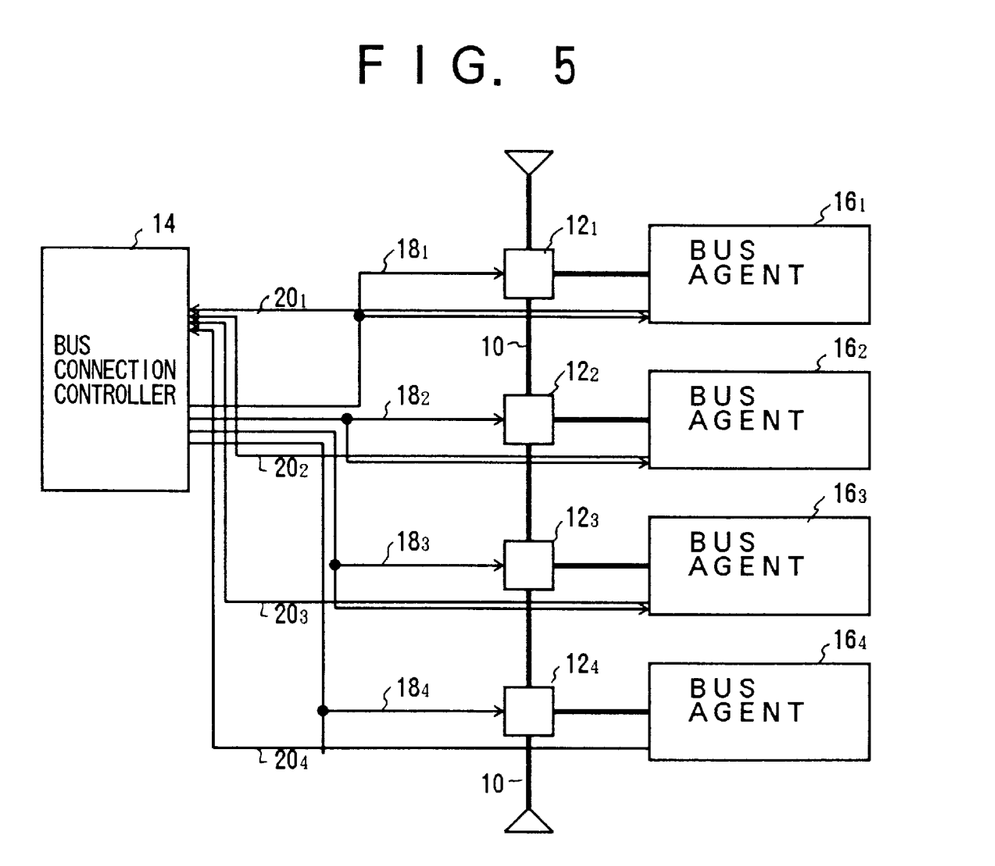
FIG. 5 is a block diagram of the bus controller according to a fourth embodiment of the present invention.

FIG. 5 is a block diagram showing the bus controller according to a fourth embodiment of the present invention. In FIG. 5, those elements that are identical to the corresponding elements of FIG. 1 are designated by the same reference numerals. The plurality of bus connectors $12_1$–$12_4$ are provided in the bus 10. The bus 10 is connected to the bus connection controller 14. The bus agents $16_1$–$16_4$ are connected to the bus connectors $12_1$–$12_4$, respectively. Of course, the number of bus agents connected to the bus connectors $12_1$–$12_4$ may vary. Only the bus agents that are necessary may be connected to the respective bus connectors. The bus agents $16_1$–$16_4$ input and output information via the bus 10. For example, the bus agents $16_1$–$16_4$ may be a hard disk drive, a flexible disk drive, a modem and the like.

The bus connectors $12_1$–$12_4$ and the bus agents $16_1$–$16_n$ are connected to the bus connection controller 14 via the control lines $18_1$–$18_4$, respectively. The bus connection controller 14 supplies a bus agent connection signal or the bus agent disconnection signal to the bus connectors $12_1$–$12_4$ and the bus agents $16_1$–$16_4$. The bus agents $16_1$–$16_4$ connected to the bus connectors $12_1$–$12_4$, respectively, are also connected to the bus connection controller 14 via the control lines $20_1$–$20_4$, respectively. Each of the bus agents $16_1$–$16_4$ supplies a request signal requesting the use of the bus 10 to the bus connection controller 14.

When the request signal is supplied by any of the bus agents $16_1$–$16_4$, the bus connection controller 14 supplies a bus agent connection signal to the bus connector to which the requesting bus agent is connected so as to control the bus connector to connect the requesting bus agent to the bus 10. The bus agent connection signal is also supplied to the associated bus agent. The bus agent supplied with the bus agent connection signal enhances the external load driving performance of a bus driver built into the bus agent so that the bus driver can drive the bus 10 properly.

The bus connection controller 14 also monitors the bus 10. When a bus agent connected to the bus 10 is not involved in an access to the bus 10 for a predetermined period of time, the bus connection controller 14 supplies a bus agent disconnection signal to the associated bus connector and the associated bus agent so as to control the bus connector to disconnect the associated bus agent from the bus 10. The electrical load on the bus 10 is maintained at a constant level by a simulated means of lowering the external load driving performance of the bus driver built into the bus agent supplied with the bus agent disconnection signal.

Thus, when the request signal is supplied by any of the bus agents $16_1$–$16_4$, the bus agent connection signal is supplied to the bus connector to which the requesting bus agent is connected so that the requesting bus agent is connected to the bus 10 and the bus driver built into the bus agent is controlled to provide the sufficient performance for driving the bus 10. When the bus agent connected to the bus 10 is not involved in an access for a predetermined period of time, the bus agent disconnection signal is supplied to the associated bus connector so that the associated bus agent is disconnected from the bus 10 and the overall electrical load on the bus 10 is maintained at a constant level by a simulated means of lowering the external load driving performance of the bus driver built into the disconnected bus agent. With this arrangement, the stable operation is insured even in a bus with a severe requirement for electrical performance, and the power consumption of the bus driver built into the disconnected bus agent is reduced.

Figure 6:
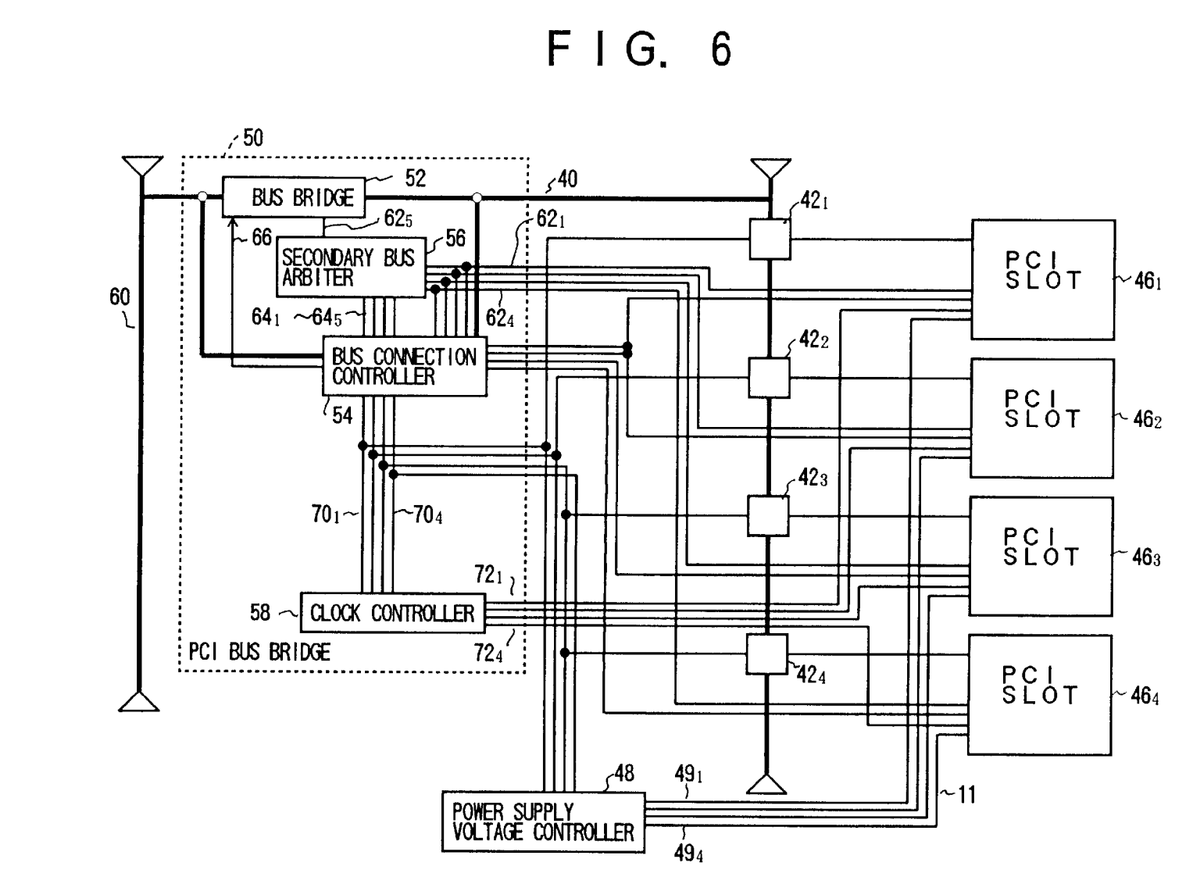
FIG. 6 is a block diagram of the bus controller according to a fifth embodiment of the present invention, adapted for a PCI bus.

FIG. 6 is a block diagram showing the bus controller according to a fifth embodiment of the present invention, adapted for a peripheral component interface (PCI) bus. A plurality of bus connectors $42_1$–$42_4$ are provided in a PCI bus 40. The PCI bus 40 is connected to a PCI bus bridge unit 52 and a bus connection controller 54 in a PCI bus bridge 50. PCI slots $46_1$–$46_4$ are connected to the bus connectors $42_1$–$42_4$, respectively. A bus agent in the form of an add-in card is inserted into one of PCI slots $46_1$–$46_4$. Of course, the number of bus agents connected to the respective PCI slots may vary. Only the bus agents that are necessary may be connected to the respective PCI slots. The bus agents input and output information via the PCI bus 40. For example, the bus agents may be a hard disk drive, a flexible disk drive, a modem and the like.

The PCI bus bridge 50 is a circuit for connecting between the PCI bus 40 to which the bus agents are connected, and a host bus 60 to which a CPU, a RAM, a ROM and the like are connected. The PCI bus bridge 50 includes the bus bridge unit 52, the bus connection controller 54, a secondary bus arbiter 56 and a clock controller 58. The bus bridge unit 52 is a main unit providing a bridge connection between the PCI bus 40 and the host bus 60. The secondary bus arbiter 56 is connected to the PCI slots $46_1$–$46_4$ via control lines $62_1$–$62_4$, respectively, and is also connected to the bus bridge unit 52 via a control line $62_5$. When a request signal requesting the use of the PCI bus 40 is issued by the bus bridge unit 52 and the bus agent connected to one of the PCI slots $46_1$–$46_4$, the secondary bus arbiter 56 arbitrates between the bus bridge unit 52 and the bus agent by examining the priority pre-assigned to the requesting bus agent and supplying a signal GNT# identifying the bus agent or the bus bridge unit 52 to which a right to use the bus is granted, to the bus connection controller 54 via a relevant one of the control lines $64_1$–$64_4$.

The bus connection controller 54 is connected to the PCI bus 40. The request signal is supplied from the PCI slots $46_1$–$46_4$ to the bus connection controller 54 via the control lines $62_1$–$62_4$, respectively. The bus connection controller 54 is also supplied by the secondary bus arbiter 56 with the signal GNT# via the control lines $64_1$–$64_4$. The bus connection controller 54 is connected to the host bus 60 and supplies a retry request signal to the bus bridge unit 52 via a control line 66. The retry signal is sent to the host bus 60 via the bus bridge 52 when the host bus 60 tries to access a disconnected bus agent.

Figure 7:
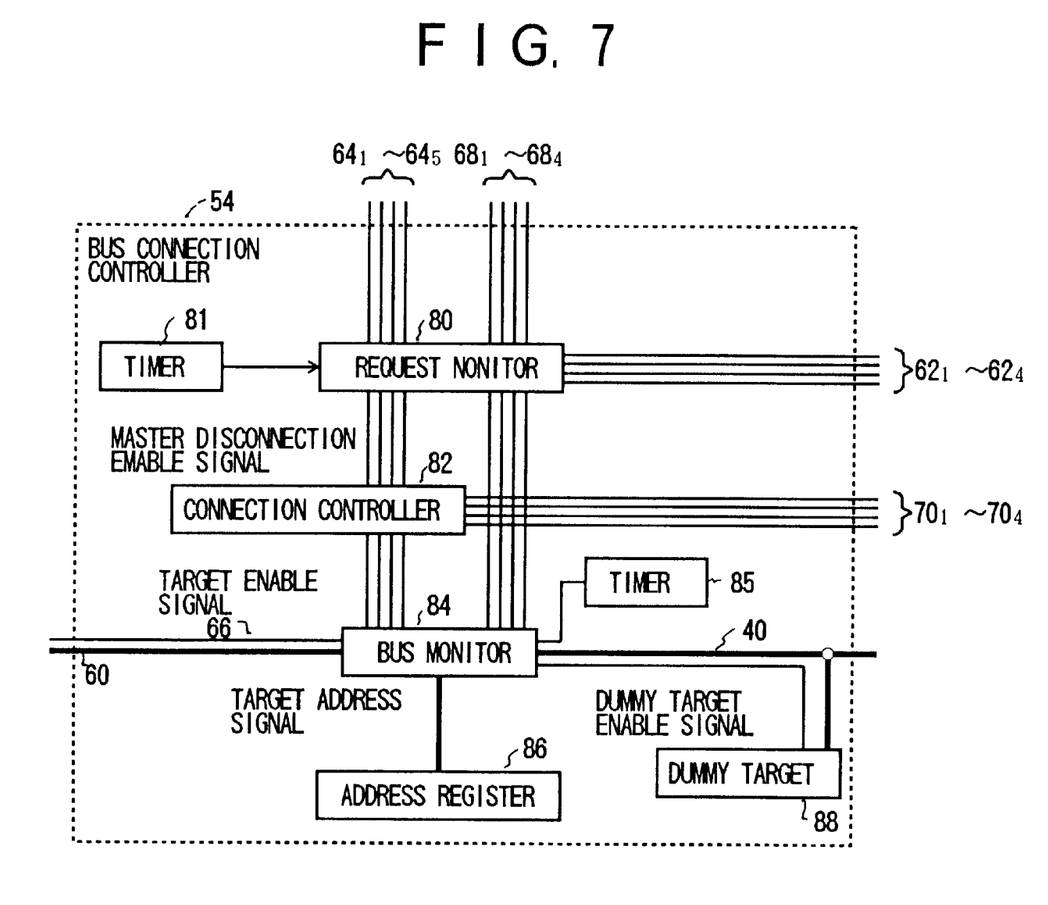
FIG. 7 is a block diagram showing the bus connection controller according to the fifth embodiment.

The bus connection controller 54 supplies the signal GNT#, for granting a right to use the PCI bus 40, to an associated one of the PCI slots $46_1$–$46_4$ via control lines $68_1$–$68_4$, respectively (see FIG. 7). The bus connection controller 54 also supplies a bus agent connection signal or the bus agent disconnection signal to an associated one of the bus connectors $42_1$–$42_4$, the clock controller 58 and a power supply voltage controller 48. The power supply voltage controller 48 supplies a power supply voltage $V_{cc}$ only to the PCI slot supplied with the bus agent connection signal, via an associated one of power lines $49_1$–$49_4$. The clock controller 58 supplies a clock signal only to the bus PCI slot supplied with the bus agent connection signal, via an associated one of clock lines $72_1$–$72_4$.

FIG. 7 is a block diagram showing the bus connection controller 54 according to the fifth embodiment. In FIG. 7, those elements that are identical to the corresponding elements of FIG. 6 are designated by the same reference numerals. A request monitor unit 80 monitors the request signal (requesting the use of the PCI bus 40) supplied from the bus agent connected to a respective one of the PCI slots $46_1$–$46_4$ via the control lines $62_1$–$62_4$, respectively. If it is determined that a time-out beyond a predetermined period of time occurs by referring to a timer 81 for measuring lapsed time for each PCI slot (bus agent), the request monitor unit 80 asserts a master disconnection enable signal (instruction for disconnecting the bus agent) supplied to a connection controller 82 so as to disconnect an associated bus agent.

The request monitor unit 80 also monitors the signal GNT# via the control lines $64_1$–$64_5$. When the signal GNT# indicating a grant of a right to use the PCI bus 40 to the disconnected bus agent is asserted, the request monitor unit 80 masks (cancels) that signal GNT# and supplies the masked signal to the PCI slots $46_1$–$46_4$ via the control lines $68_1$–$68_4$, respectively. Granting a right to use the bus to the disconnected bus agent is improper in that the PCI bus 40 becomes unavailable unless the masking is performed. A grant of a right to use the bus should be supplied to the disconnected bus agent after that bus agent is connected.

A bus monitor unit 84 monitors the host bus 60 and the PCI bus 40. When the PCI bus 40 is initialized, the address space available for the bus agent connected to the PCI bus 40 is assigned to each of the bus agents. The assigned address space is stored in an address register unit 86. The address space stored in the address register unit 86 is compared with the address monitored to occur on the PCI bus 40. A timer 85 is coupled to the bus monitor unit 84 so as to measure an access interval for each PCI slot (bus agent). When it is determined that a time-out beyond a predetermined period of time occurs by referring to the timer 85, the bus monitor unit 84 asserts a target disconnection enable signal (instruction to disconnect the bus agent) supplied to the connection controller 82 so as to disconnect an associated bus agent.

The bus monitor unit 84 compares the address space stored in the address register unit 86 with the address monitored to occur on the host bus 60. When the address that occurs on the host bus 60 indicates an access to the disconnected bus agent, the bus monitor unit 84 asserts a retry request signal supplied to the bus bridge unit 52 via the control line 66. In addition, the bus monitor unit 84 deasserts a target disconnection enable signal for the disconnected bus agent so as to request the connection controller 82 to perform reconnection. Such an arrangement is necessary in order to access the target bus agent again after the bus agent is connected.

The bus monitor unit 84 compares the address space stored in the address register unit 86 with the address monitored to occur on the PCI bus 40. When the bus monitor unit 84 detects an access to the bus agent disconnected in response to the bus agent disconnection signal, delivered on control lines $70_1$–$70_4$, the bus monitor unit 84 asserts the dummy target enable signal supplied to a dummy target unit 88 so that the dummy target unit 88 returns a retry request signal to the bus agent to be accessed. Further, the bus monitor unit 84 reasserts the target disconnection enable signal for that bus agent so as to demand cancellation of the disconnection and request the connection controller 82 to perform reconnection. Such an arrangement is necessary in order to access the target bus agent again after the bus agent is connected.

Figure 8:
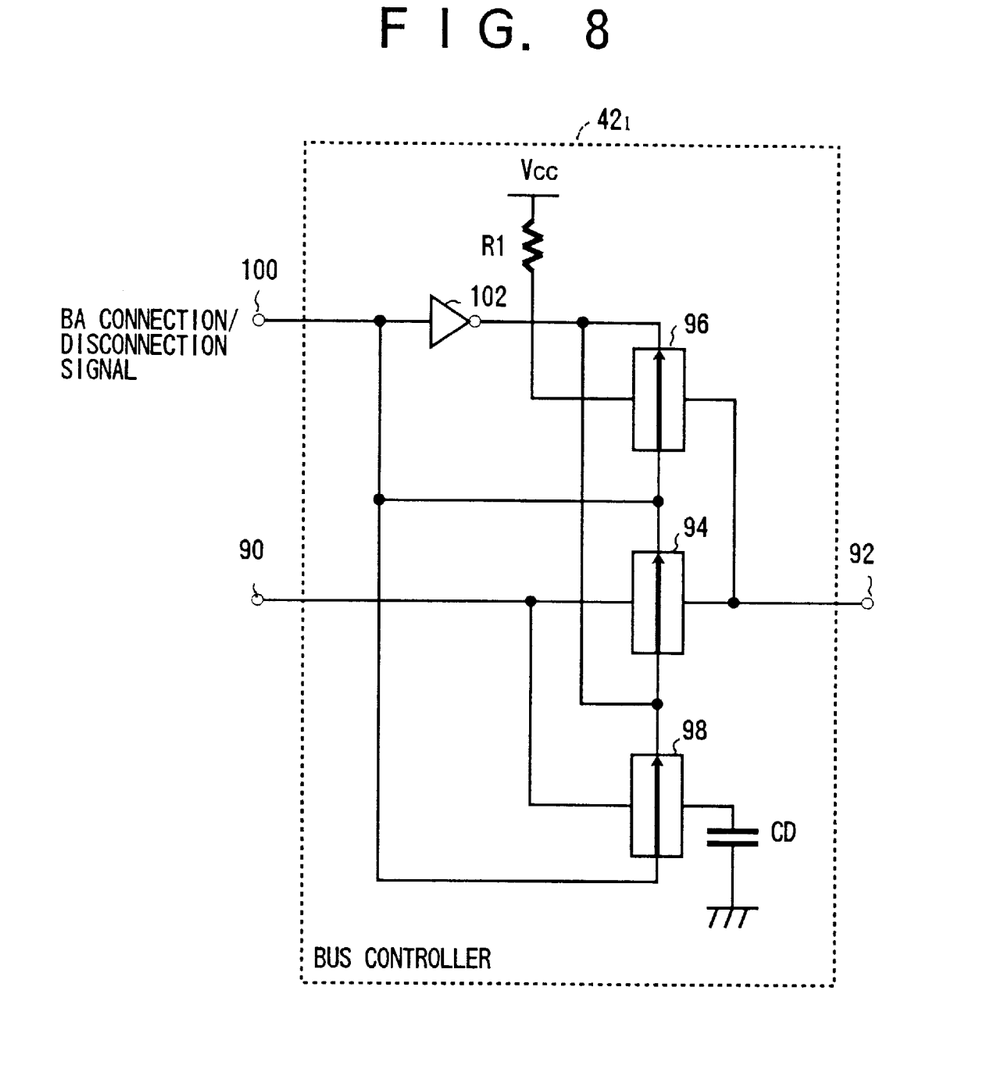
FIG. 8 shows a circuit configuration of the bus connectors according to the fifth embodiment.

FIG. 8 shows a circuit configuration of the bus connectors $42_1$–$42_4$ according to the fifth embodiment. The bus connector $42_1$, will be described as an example. In FIG. 8, those components that are identical to the corresponding components of FIG. 6 are designated by the same reference numerals. Referring to FIG. 8, a terminal 90 is connected to the PCI bus 40, and a terminal 92 is connected to the PCI slot $46_1$. An analog switch 94 is connected between the terminals 90 and 92. The terminal 92 is connected to a power supply (voltage $V_{cc}$) via an analog switch 96 and a pull-up resistor R1. The terminal 90 is grounded via an analog switch 98 and a dummy load $C_D$.

A terminal 100 is connected to the control line $70_1$. The bus agent connection signal and the bus agent disconnection signal supplied via the control line $70_1$ is supplied to a positive control terminal of the analog switch 94, and to negative control terminals of the analog switches 96 and 98. The bus agent connection signal and the bus agent disconnection signal are inverted by an inverter 102 and supplied to a positive control terminal of the analog switches 96 and 98, and to a negative control terminal of the analog switch 94.

When the terminal 100 is at a high level, indicating that a bus agent is to be connected to the PCI bus 40, the analog switch 94 is closed and the analog switches 96 and 98 are open so that connection is established between the PCI bus 40 and the PCI slot $46_1$. When the terminal 100 is at a low level, indicating that the bus agent is to be disconnected from the PCI bus 40, the analog switches 96 and 98 are closed and the analog switch 94 is open so that the PCI bus 40 is disconnected from the PCI slot $46_1$. With this, the PCI slot $46_1$ is pulled up to the voltage $V_{cc}$ and the PCI bus 40 is terminated with the dummy load $C_D$.

The present invention is not limited to the above-described embodiments, and variations and modifications may be made without departing from the scope of the present invention.

What is claimed is:

1. A bus controller controlling connection of a plurality of bus agents to a bus including a PCI bus, said bus controller controlling a bus bridge for selectively connecting said PCI bus and a host bus and comprising:
    a plurality of bus connectors in said bus respectively, and selectively, connecting said plurality of bus agents to said bus and disconnecting said plurality of bus agents from said bus;
    a bus connection controller monitoring said bus and controlling said plurality of bus connectors so as to disconnect any bus agent which is not accessed for a predetermined period of time; and
    a power supply voltage controller supplying a power supply voltage to each of said bus agents, said bus connection controller controlling said power supply voltage controller to reduce the power supply voltage supplied, or to stop supply of the power supply voltage, to any bus agent disconnected from said bus, said bus connection controller comprising:
    a request monitor unit monitoring respective requests from said plurality of bus agents to use said PCI bus and disconnecting from said bus any bus agent not issuing a respective request for a predetermined period of time, and
    said bus monitor unit monitoring a signal for controlling each of said plurality of bus connectors and a signal for granting a right to use the PCI bus, and canceling the grant of the right to use the PCI bus when said grant is issued to a disconnected bus agent.

2. The bus controller as claimed in claim 1, wherein each of said bus connectors has a switch which selectively connects one of the respective bus agent and a related dummy load to said bus such that the related dummy load is connected to said bus when a bus agent is disconnected from said bus.

3. The bus controller as claimed in claim 1, further comprising:
    a clock controller supplying a clock signal to each of said bus agents; and
    said bus connection controller controls said clock controller so as to reduce a frequency of the clock signal supplied, or to stop the supply of the clock signal, to the bus agent disconnected from said bus.

4. The bus controller as claimed in claim 1, wherein said bus connection controller lowers an external load driving performance of the bus agent disconnected from said bus.

5. A bus controller controlling connection of a plurality of bus agents to a bus, said bus including a PCI bus and said bus controller controlling the bus bridge for selectively connecting said PCI bus and a host bus, and comprising:
    a plurality of bus connectors provided in said bus and controllable so as to, selectively and respectively, connect said plurality of bus agents to said bus and disconnect said plurality of bus agents from said bus; and
    a bus connection controller monitoring said bus and selectively controlling said plurality of bus connectors so as to disconnect any bus agent which is not accessed for a predetermined period of time; and
    a power supply voltage controller supplying a power supply voltage to each of said bus agents, said bus connection controller controlling said power supply voltage controller to reduce the power supply voltage supplied, or to stop supply of the power supply voltage, to any bus agent disconnected from said bus, said bus connection controller comprising:
    a request monitor unit monitoring respective requests from said plurality of bus agents to use said PCI bus and disconnecting from said bus any bus agent not issuing a respective request for a predetermined period of time, and
    a bus monitor unit monitoring an address supplied from said PCI bus and said host bus to each of said plurality of bus agents and disconnecting from said PCI bus any bus agent which is not accessed for a predetermined period of time, said bus monitor unit, further, monitoring a signal for controlling each of said plurality of bus connectors, and, when an access to a disconnected agent is detected, requesting a retry of the access and canceling the disconnection.

* * * * *

UNITED STATES PATENT AND TRADEMARK OFFICE
CERTIFICATE OF CORRECTION

PATENT NO. : 6,073,195
DATED : June 6, 2000
INVENTOR(S) : Yukihiro OKADA

It is certified that error appears in the above-indentified patent and that said Letters Patent is hereby corrected as shown below:

Col. 10,      line 18, change "a" to --the--;
               line 33, change "the" to --a--.

Signed and Sealed this

Twentieth Day of March, 2001

Attest:

NICHOLAS P. GODICI

*Attesting Officer*     *Acting Director of the United States Patent and Trademark Office*